United States Patent
Shu et al.

(10) Patent No.: US 8,105,563 B2
(45) Date of Patent: Jan. 31, 2012

(54) METHODS OF CONTROLLING HYDROGEN CONCENTRATIONS IN AN OFFGAS SYSTEM OF A NUCLEAR REACTOR BY PASSIVE AIR INJECTION

(75) Inventors: Paul Y. Shu, San Jose, CA (US); John C. Whittaker, Plymouth, MA (US); Angelito Foz Gonzaga, San Jose, CA (US); Luong C. Tran, San Jose, CA (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 212 days.

(21) Appl. No.: 12/647,819

(22) Filed: Dec. 28, 2009

(65) Prior Publication Data
US 2011/0158879 A1 Jun. 30, 2011

(51) Int. Cl.
*B01D 53/46* (2006.01)
(52) U.S. Cl. .............. 423/248; 422/105; 422/111
(58) Field of Classification Search .......... 423/248; 422/105, 111
See application file for complete search history.

(56) References Cited

U.S. PATENT DOCUMENTS

| | | | |
|---|---|---|---|
| 3,658,996 A * | 4/1972 | Frumerman et al. | 422/111 |
| 4,014,984 A * | 3/1977 | Parnes | 423/580.1 |
| 4,119,706 A * | 10/1978 | Rogers | 423/580.1 |
| 2002/0076358 A1* | 6/2002 | Eckardt et al. | 422/105 |
| 2011/0095208 A1* | 4/2011 | Abadie et al. | 250/507.1 |

* cited by examiner

*Primary Examiner* — Timothy Vanoy
(74) *Attorney, Agent, or Firm* — Harness, Dickey & Pierce, P.L.C.

(57) ABSTRACT

Example embodiments relate to methods of controlling hydrogen concentrations in an offgas system of a nuclear reactor by passive air injection. A method according to a non-limiting embodiment may include passively injecting ambient air through the hydrogen water chemistry system into an existing offgas line of the offgas system. The offgas line is configured to transport non-condensable gases, including hydrogen, from a condenser to a recombiner. As a result of the passive air injection, the combined flow of hydrogen and oxygen react in the recombiner to form water vapor, thereby reducing the hydrogen concentration of the offgas exiting the recombiner.

20 Claims, 4 Drawing Sheets

METHODS OF CONTROLLING HYDROGEN CONCENTRATIONS IN AN OFFGAS SYSTEM OF A NUCLEAR REACTOR BY PASSIVE AIR INJECTION

FIELD

Example embodiments of the present invention relate to methods of controlling hydrogen concentrations in an offgas system of a nuclear reactor.

DESCRIPTION OF RELATED ART

A nuclear reactor (e.g., boiling water reactor (BWR)) typically experiences corrosion caused by oxygen generated from the radiolysis of water. For instance, the recirculation piping and reactor internals may experience intergranular stress corrosion cracking (IGSCC). As a result, a hydrogen water chemistry (HWC) system injects hydrogen into the condensate/feedwater system to reduce the amount of dissolved oxygen within the recirculation piping and the reactor internals.

However, hydrogen injection into the condensate/feedwater may result in an increase in the normal hydrogen to oxygen ratio of 2:1 in the offgas. Depending on the amount of hydrogen added and the condenser air inleakage rate, this increase could result in the offgas at the recombiner exit becoming hydrogen rich. To prevent this potentially hazardous situation, additional oxygen is injected into the offgas system. Conventionally, the additional oxygen is supplied by flowing compressed air or pure compressed oxygen from a pertinent source. The proper amount of additional oxygen is determined from the hydrogen injection rate and the air inleakage rate and is controlled by the hydrogen water chemistry (HWC) system.

SUMMARY

A method of controlling hydrogen concentrations in an offgas system of a nuclear reactor by hydrogen water chemistry system injection may include passively injecting ambient air through the hydrogen water chemistry system into an existing offgas line of the offgas system. The offgas line is configured to transport gases containing hydrogen, oxygen, and other non-condensable gases from a condenser to a recombiner. The recombiner is configured to react hydrogen with oxygen to form water vapor.

A method of passively injecting air of a hydrogen water chemistry system into an offgas system of a nuclear reactor according to a non-limiting example embodiment of the present invention may include operatively coupling an air injection line to an existing offgas line of the offgas system. The offgas line is configured to transport offgas containing hydrogen, oxygen, and other non-condensable gases from a condenser to a recombiner. The air injection line is configured to passively introduce ambient air into the offgas line at a point upstream from the recombiner to produce a combined flow. The method also includes measuring a concentration of at least one of hydrogen and oxygen in an offgas flow exiting the recombiner. When used as a primary source of air, the method additionally includes generating an injection signal whenever the hydrogen water chemistry system is on. When used as a backup source of oxygen, the method additionally includes generating an injection signal as long as the measured oxygen concentration is lower than a predetermined oxygen value or the measured hydrogen concentration exceeds a predetermined hydrogen value. The method further includes automatically opening a valve in response to the injection signal so as to passively introduce ambient air as a source of oxygen into the offgas line. The ambient air is drawn into the offgas line by a vacuum exerted by the offgas system. The oxygen and hydrogen in the combined flow react in the recombiner to form water vapor.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
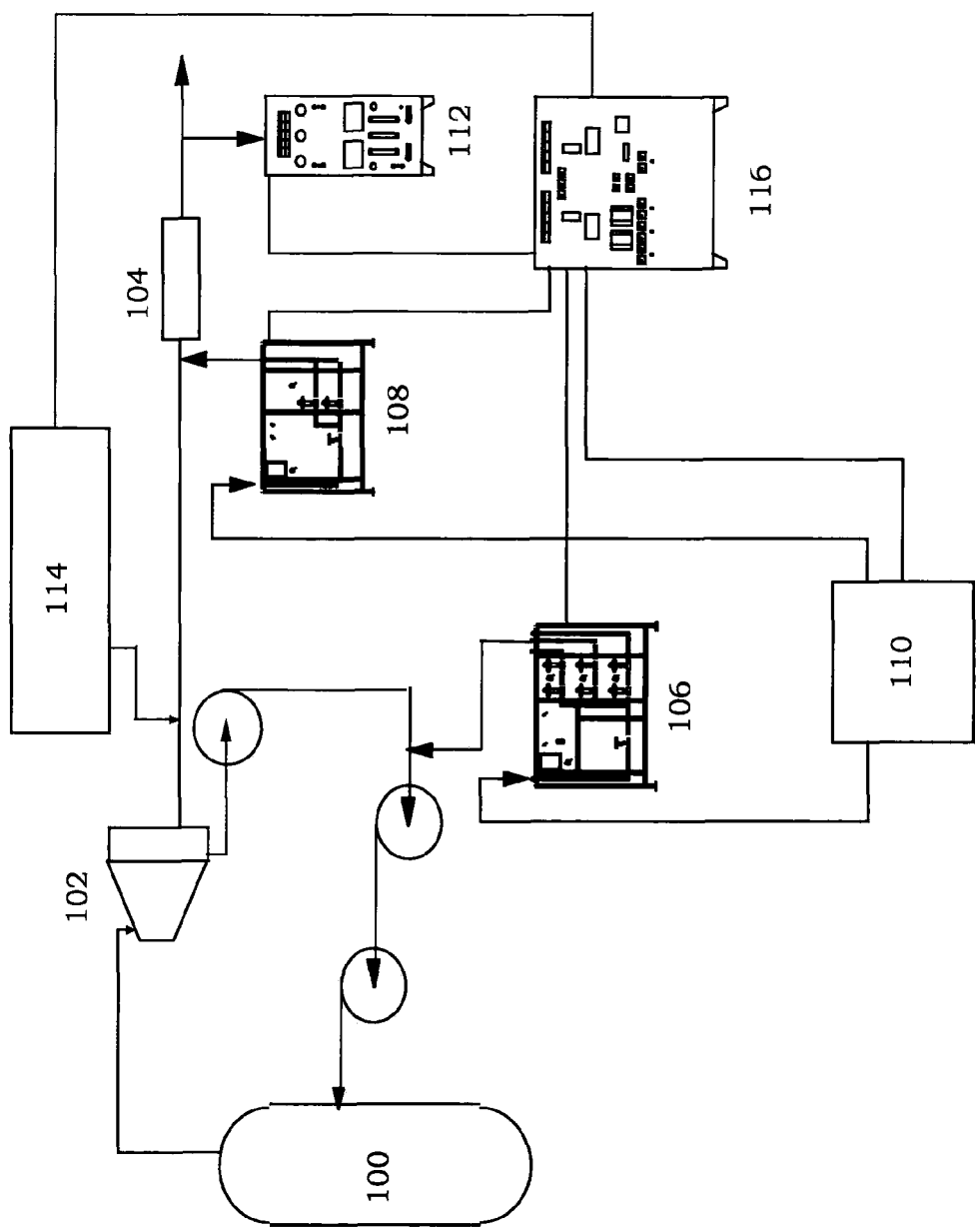
FIG. 1 is a schematic of a hydrogen water chemistry system utilizing passive air injection as a backup source of oxygen according to an example embodiment of the invention.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Example embodiments should not be construed as limited to the shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms; including those defined in commonly used dictionaries, should be interpreted as having a meaning that is consistent with their meaning in the context of the relevant art and will not be interpreted in an idealized or overly formal sense unless expressly so defined herein.

Example embodiments of the present invention relate to a method of controlling hydrogen concentrations in an offgas system of a nuclear reactor by hydrogen water chemistry system injection. The method may include passively injecting ambient air through the hydrogen water chemistry system into an existing offgas line of the offgas system. The offgas line is configured to transport gases containing hydrogen, oxygen, and other non-condensable gases from a condenser to a recombiner. The recombiner is configured to react hydrogen with oxygen to form water vapor.

The ambient air is passively injected into the offgas line at a point upstream from the recombiner. The ambient air may be filtered prior to injection into the offgas line. The ambient air may be passively injected by opening an automatic valve and having the ambient air drawn into the offgas line by a vacuum exerted by the offgas system. The automatic valve may be an air-operated isolation valve that is controlled through a solenoid valve. Alternatively, the automatic valve may be just a solenoid valve. Furthermore, in a non-limiting embodiment, the vacuum exerted by the offgas system may be generated by steam jet air ejectors (SJAEs).

The ambient air may be passively injected at a desired flow into the offgas line with a critical flow orifice. Alternatively, the ambient air may be passively injected at a desired flow into the offgas line with a flow meter and flow control valve. In a non-limiting embodiment, the ambient air may be passively injected as a backup source of oxygen for the hydrogen water chemistry system. In another non-limiting embodiment, the ambient air may be passively injected as a primary source of oxygen for the hydrogen water chemistry system.

A method of passively injecting air of a hydrogen water chemistry system into an offgas system of a nuclear reactor according to a non-limiting example embodiment of the present invention may include operatively coupling an air injection line to an existing offgas line of the offgas system. The offgas line is configured to transport offgas containing hydrogen, oxygen, and other non-condensable gases from a condenser to a recombiner. The air injection line is configured to passively introduce ambient air into the offgas line at a point upstream from the recombiner to produce a combined flow. The method also includes measuring a concentration of at least one of hydrogen and oxygen in an offgas flow exiting the recombiner. When used as a primary source of air, the method additionally includes generating an injection signal whenever the hydrogen water chemistry system is on. When used as a backup source of oxygen, the method additionally includes generating an injection signal as long as the measured oxygen concentration is lower than a predetermined oxygen value or the measured hydrogen concentration exceeds a predetermined hydrogen value. The method further includes automatically opening a valve in response to the injection signal so as to passively introduce ambient air as a source of oxygen into the offgas line. The ambient air is drawn into the offgas line by a vacuum exerted by the offgas system. The oxygen and hydrogen in the combined flow react in the recombiner to form water vapor.

When used as a backup source of oxygen, the method may further include generating a stop signal as long as the measured oxygen concentration exceeds the predetermined oxygen value. The valve may be automatically closed in response to the stop signal. The valve may be an automatic isolation valve. In a non-limiting embodiment, the automatic isolation valve may be an air-operated valve controlled through a solenoid valve. Alternatively, the automatic isolation valve may be just a solenoid valve. The ambient air may be filtered prior to introduction into the offgas line. The ambient air may also contain about 21% oxygen. The ambient air may be passively introduced into the offgas line at a desired flow with a critical flow orifice. The critical flow orifice may be sized based on ambient air and offgas pressures.

Controlling hydrogen concentrations in an offgas system of a nuclear reactor according to example embodiments of the present invention may involve the use of a passive air injection module. The passive air injection module uses ambient air as an oxygen source for the hydrogen water chemistry (HWC) system. As a result, the ambient air provides oxygen to the offgas system to recombine with the hydrogen added to the feedwater in the hydrogen water chemistry system. With appropriate sizing of a valve trim and a critical flow orifice, the passive air injection module is capable of providing the desired amount of constant air flow into the offgas system. Thus, the passive air injection module can function as a primary oxygen source or a backup oxygen source in a hydrogen water chemistry system.

FIG. 1 is a schematic of a hydrogen water chemistry system utilizing passive air injection as a backup source of oxygen according to an example embodiment of the invention. Referring to FIG. 1, steam from the reactor vessel 100 is supplied to the turbine/condenser 102, where the steam is used to drive the turbine so as to generate electricity. After passing through the turbine, the steam is condensed in the condenser. The condensate is returned as feedwater to the reactor vessel 100, while the non-condensable gases are transported via an offgas line to the recombiner 104.

A nuclear reactor typically experiences corrosion caused by oxygen generated from the radiolysis of water. To reduce the amount of dissolved oxygen within the recirculation piping, the reactor internals, and main steam, a hydrogen injection unit 106 is used to inject hydrogen into the condensate/feedwater. However, hydrogen injection into the condensate/feedwater may result in hydrogen-rich offgas exiting the recombiner 104. To prevent this potentially hazardous situation, an oxygen injection unit 108 is used to inject oxygen into the offgas line. Gas supplies 110 provide the hydrogen and oxygen to the hydrogen injection unit 106 and oxygen injection unit 108, respectively. Furthermore, a passive air injection module 114 is operatively coupled to the offgas line via an air injection line. The passive air injection module 114 may serve as a backup source of oxygen in the event that the oxygen injection unit 108 or gas supply 110 fail or otherwise malfunction.

Figure 2:
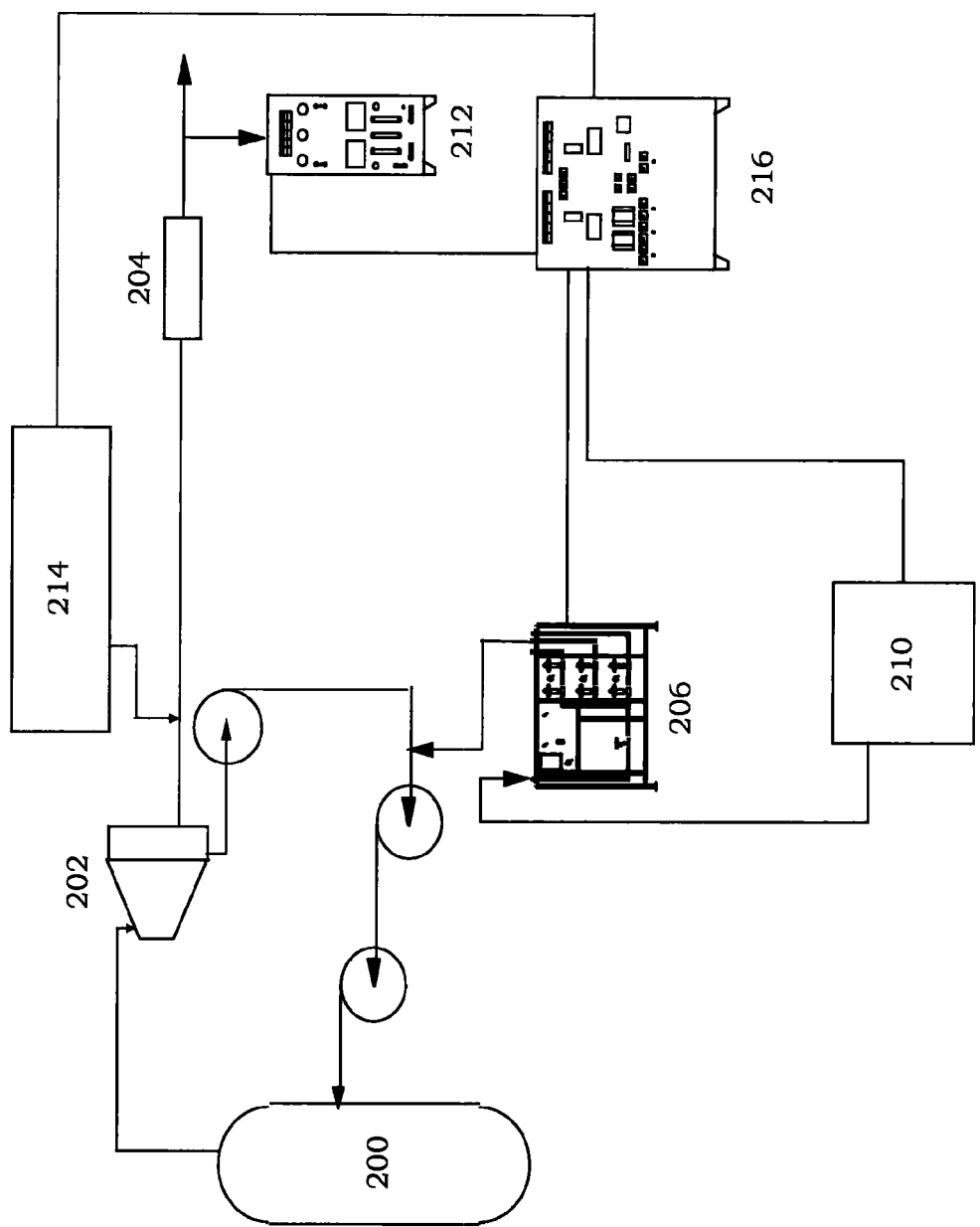
FIG. 2 is a schematic of a hydrogen water chemistry system utilizing passive air injection as a primary source of oxygen according to an example embodiment of the invention.

The hydrogen concentration and/or oxygen concentration of the offgas flow exiting the recombiner 104 is measured with a monitor 112. A main control 116 is connected to the monitor 112 as well as the hydrogen injection unit 106, the oxygen injection unit 108, the gas supply 110, and the passive air injection module 114. At various times, the oxygen concentration may fall below a predetermined oxygen value or the hydrogen concentration may rise above a predetermined hydrogen value. Such changes in the oxygen and/or hydrogen concentration may be caused by the malfunction of one or more units (e.g., oxygen injection unit 108). Accordingly, an injection signal is generated as long as the measured oxygen concentration is lower than a predetermined oxygen value and/or the measured hydrogen concentration exceeds a predetermined hydrogen value or predetermined malfunctions occur. A valve of the passive air injection module 114 may be automatically opened in response to the injection signal so as to passively introduce ambient air as a source of oxygen into the offgas line. The ambient air may be drawn into the offgas line by a vacuum exerted by the offgas system so as to form a combined flow with the non-condensable gases. The oxygen and hydrogen in the combined flow react in the recombiner 104 to form water vapor FIG. 2 is a schematic of a hydrogen water chemistry system utilizing passive air injection as a primary source of oxygen according to an example embodiment of the invention. The reactor vessel 200, turbine/condenser 202, recombiner 204, hydrogen injection unit 206, gas supply 210, monitor 212, passive air injection module 214, and main control 216 of FIG. 2 correspond to the reactor vessel 100, turbine/condenser 102, recombiner 104, hydrogen injection unit 106, gas supply 110, monitor 112, passive air injection module 114, and main control 116 of FIG. 1. Thus, the description of parts corresponding to those already discussed will not be duplicated below for purposes of brevity. FIG. 2 primarily differs from FIG. 1 in that the passive air injection module 214 is utilized as a primary source of oxygen. Thus, a unit corresponding to the oxygen injection unit 108 of FIG. 1 is absent from FIG. 2. Because the passive air injection module 214 is being utilized as a primary source of oxygen, the passive air injection module 214 may be configured to provide a constant, passive air flow into the offgas line so as to control hydrogen concentrations in the offgas system.

Figure 3:
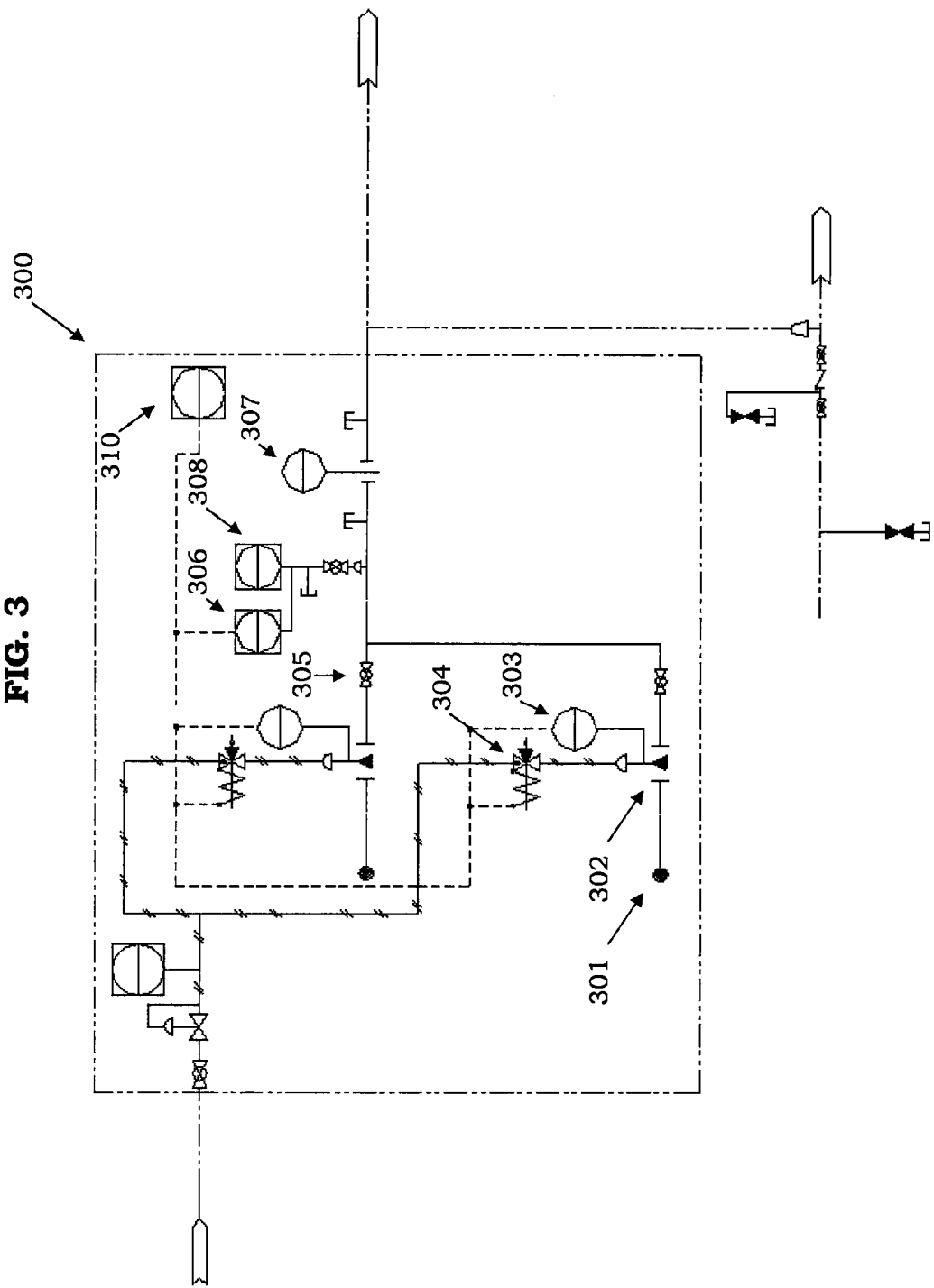
FIG. 3 is a diagram of a passive air injection module according to an example embodiment of the invention.

FIG. 3 is a diagram of a passive air injection module according to an example embodiment of the invention. Referring to FIG. 3, the passive air injection module 300 is configured to direct ambient air through redundant valves to the injection line leading to the offgas system. The injection point for the ambient air is upstream from the recombiner. The passive air injection module 300 includes, for instance, one or more of an air filter 301, automatic isolation valve (AOV) 302, valve position switch 303, solenoid valve (SOV) 304, manual isolation valve 305, pressure transmitter 306, critical flow orifice (CFO) 307, local pressure gauge 308, piping, and control panel 310. The pressure transmitter 306 and valve position switches 303 send signals to the control panel 310.

Figure 4:
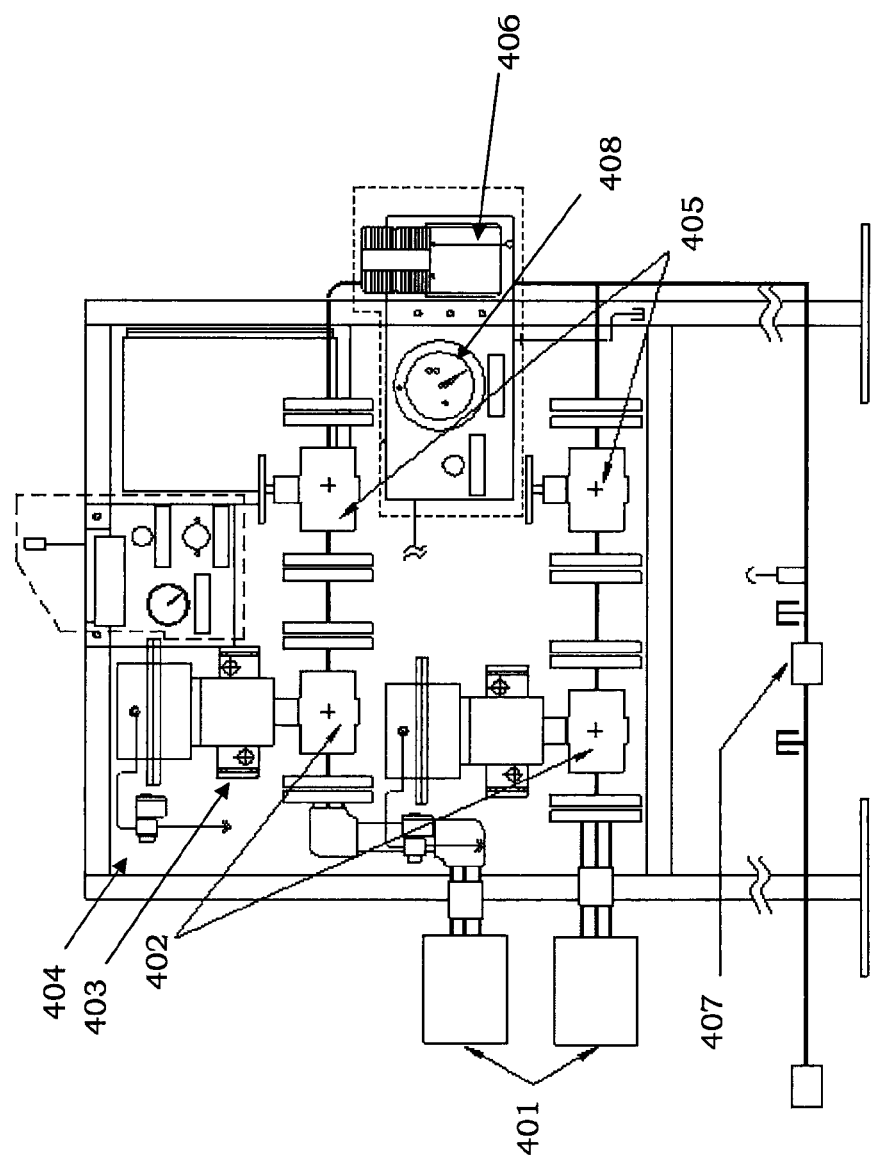
FIG. 4 is a layout of a passive air injection module according to an example embodiment of the invention.

One or more air filters 301 (e.g., 2—one for each redundant air supply as shown in FIG. 4 as 401) filter the ambient air to meet plant requirements for offgas cleanliness. The automatic isolation valve 302 opens when required for air injection into the offgas. The automatic isolation valve 302 may be remotely-operated, air-to-close, and/or spring-to-open. Valve position switches 303 may be mounted on each valve assembly to indicate an open or closed valve position. Valve position may be indicated at the control panel 310. The automatic isolation valve 302 may be automatically controlled through the solenoid valve 304 by shutdown, reset, and start logic. Alternatively, the automatic isolation valve 302 may be manually operated from the control panel 310.

A manual isolation valve 305 may be provided for the passive air injection module 300 for isolation and maintenance. The pressure transmitter 306 may provide a signal to the control panel 310 to indicate air line pressure. The pressure transmitter 306 is normally exposed to the condenser vacuum through the critical flow orifice 307. An increase in pressure at the pressure transmitter 306 may indicate that at least one automatic isolation valve 302 has opened and flow has actuated.

The critical flow orifice 307 may be sized based on ambient pressure, inline components, and the offgas injection point pressure so as to establish the desired air flow for air injection. A local pressure gauge 308 may also alternatively function as a pressure indicator for air flow information in the event the pressure transmitter 306 is inoperable.

Remote valve control switches in the control panel 310 may be used to select a closed or permissive open (auto) setting for operation of the automatic isolation valves 302. The closed position keeps the solenoid valve 304 energized and the automatic isolation valve 302 closed. In the auto position, the automatic isolation valve 302 will remain closed until the logic sends a signal to open the automatic isolation valve 302. Where the passive air injection module 300 includes a plurality of remote valves 302 and their, control switches in the control panel 310, at least one of the valve control switches must be in AUTO for the system to start. For example, when the passive air injection module 300 is used as a backup oxygen source, a warning alarm actuates if all valve control switches are placed in CLOSE when the system is on. On the other hand, when the passive air injection module 300 is used as the primary oxygen source, the system will shut down if no automatic isolation valve 302 is open.

As a backup oxygen source, the passive air injection module 300 is intended to replace the oxygen injection should the oxygen injection unit fail to properly inject oxygen during hydrogen injection. The passive air flow from the module 300 is designed to prevent both a high offgas hydrogen concentration and a high offgas oxygen concentration downstream from the recombiner. Although various non-limiting situations are discussed above, it should be understood that the passive air flow from the module 300 may be designed to automatically actuate based on various plant specific conditions.

FIG. 4 is a layout of a passive air injection module according to an example embodiment of the invention. The air filter 401, automatic isolation valve (AOV) 402, valve position switch 403, solenoid valve (SOV) 404, manual isolation valve 405, pressure transmitter 406, critical flow orifice (CFO) 407, and pressure gauge 408 of FIG. 4 correspond to the air filter 301, automatic isolation valve (AOV) 302, valve position switch 303, solenoid valve (SOV) 304, manual isolation valve 305, pressure transmitter 306, critical flow orifice (CFO) 307, and pressure gauge 308 of FIG. 3. Thus, the description of parts corresponding to those already discussed will not be duplicated below for purposes of brevity.

According to the non-limiting example embodiments of the present invention, controlling hydrogen concentrations in an offgas system of a nuclear reactor by passive air injection results in fewer components and maintenance requirements than if a conventional compressed air system or compressed oxygen supply is chosen as an oxygen source. Because of the fewer components and reduced maintenance, improved reliability and availability may be achieved. Additionally, by using passive air injection, the need for a unique/particular air supply system or oxygen supply for a hydrogen water chemistry system (if used) is eliminated, thereby avoiding unnecessary plant system interface. An air injection module according to a non-limiting embodiment of the invention involves little or no energy usage, since it is a passive system, by taking advantage of the existing main condenser vacuum for motive force. The passive air injection module may be utilized as a primary air supply or as a backup air supply in the event an existing oxygen source becomes inoperable.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of controlling hydrogen concentrations in an offgas system of a nuclear reactor by hydrogen water chemistry system injection, the method comprising:
passively injecting ambient air through the hydrogen water chemistry system into an existing offgas line of the offgas system, the offgas line configured to transport gases containing hydrogen, oxygen, and other non-condensable gases from a condenser to a recombiner, the recombiner configured to react hydrogen with oxygen to form water vapor.

2. The method of claim 1, wherein the ambient air is passively injected into the offgas line at a point upstream from the recombiner.

3. The method of claim 1, wherein the ambient air is passively injected by opening an automatic valve and having the ambient air drawn into the offgas line by a vacuum exerted by the offgas system.

4. The method of claim 3, wherein the automatic valve is an air-operated isolation valve that is controlled through a solenoid valve.

5. The method of claim 3, wherein the automatic valve is a solenoid valve.

6. The method of claim 1, wherein the ambient air is passively injected at a desired flow into the offgas line with a critical flow orifice.

7. The method of claim 1, wherein the ambient air is passively injected at a desired flow into the offgas line with a flow meter and flow control valve.

8. The method of claim 1, further comprising:
filtering the ambient air prior to injection into the offgas line.

9. The method of claim 1, wherein the ambient air is passively injected as a backup source of oxygen for the hydrogen water chemistry system.

10. The method of claim 1, wherein the ambient air is passively injected as a primary source of oxygen for the hydrogen water chemistry system.

11. A method of passively injecting air through a hydrogen water chemistry system into an offgas system of a nuclear reactor, the method comprising:
operatively coupling an air injection line to an existing offgas line of the offgas system, the offgas line configured to transport offgas containing hydrogen, oxygen, and other non-condensable gases from a condenser to a recombiner, the air injection line configured to passively introduce ambient air into the offgas line at a point upstream from the recombiner to produce a combined flow;
measuring a concentration of at least one of hydrogen and oxygen in an offgas flow exiting the recombiner;
generating an injection signal, the injection signal being generated as long as the measured oxygen concentration is lower than a predetermined oxygen value or the measured hydrogen concentration exceeds a predetermined hydrogen value when the ambient air is being passively introduced as a backup source of oxygen, the injection signal being generated as long as the hydrogen water chemistry system is initiated when the ambient air is being passively introduced as a primary source of oxygen; and
automatically opening a valve in response to the injection signal so as to passively introduce ambient air as a source of oxygen into the offgas line, the ambient air being drawn into the offgas line by a vacuum exerted by the offgas system, the oxygen and hydrogen in the combined flow reacting in the recombiner to form water vapor.

12. The method of claim 11, wherein the ambient air contains about 21% oxygen gas.

13. The method of claim 11, further comprising:
filtering the ambient air prior to introduction into the offgas line.

14. The method of claim 11, further comprising:
generating a stop signal as long as the measured oxygen concentration exceeds the predetermined oxygen value when the ambient air is being passively introduced as a backup source of oxygen.

15. The method of claim 14, further comprising:
automatically closing the valve in response to the stop signal.

16. The method of claim 11, wherein the valve is an automatic isolation valve.

17. The method of claim 16, wherein the automatic isolation valve is an air-operated valve controlled through a solenoid valve.

18. The method of claim 16, wherein the automatic isolation valve is a solenoid valve.

19. The method of claim 11, further comprising:
passively introducing the ambient air into the offgas line at a desired flow with a critical flow orifice.

20. The method of claim 19, wherein the critical flow orifice is sized based on ambient air and offgas pressures.

* * * * *